(12) United States Patent
Toennessen

(10) Patent No.: US 8,902,696 B2
(45) Date of Patent: Dec. 2, 2014

(54) MULTIWING SURFACE FREE TOWING SYSTEM

(75) Inventor: Rune Toennessen, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 1022 days.

(21) Appl. No.: 12/749,970

(22) Filed: Mar. 30, 2010

(65) Prior Publication Data

US 2010/0254216 A1 Oct. 7, 2010

Related U.S. Application Data

(60) Provisional application No. 61/166,589, filed on Apr. 3, 2009.

(51) Int. Cl.
*B63B 21/66* (2006.01)
*G01V 1/38* (2006.01)

(52) U.S. Cl.
CPC .............. *B63B 21/66* (2013.01); *G01V 1/3826* (2013.01)
USPC .............................. 367/20; 114/253; 114/244

(58) Field of Classification Search
CPC ...... G01V 1/38; G01V 1/3817; G01V 1/3826
USPC ................. 367/16, 17; 114/244, 245
See application file for complete search history.

(56) References Cited

U.S. PATENT DOCUMENTS

| | | | | |
|---|---|---|---|---|
| 2,407,850 A * | 9/1946 | Seifried | ...................... | 219/50 |
| 2,414,480 A * | 1/1947 | Morrill | ...................... | 114/244 |
| 2,960,960 A * | 11/1960 | Fehlner | ...................... | 114/245 |
| 2,981,220 A * | 4/1961 | Fehlner | ...................... | 114/245 |
| 3,159,806 A * | 12/1964 | Piasecki | ...................... | 367/106 |
| 3,375,800 A * | 4/1968 | Buller et al. | ...................... | 114/245 |
| 3,774,570 A * | 11/1973 | Pearson | ...................... | 114/245 |
| 4,027,616 A * | 6/1977 | Guenther et al. | ...................... | 114/244 |
| 4,130,078 A * | 12/1978 | Cholet | ...................... | 114/244 |
| 4,726,315 A * | 2/1988 | Bell et al. | ...................... | 114/244 |
| 4,729,333 A * | 3/1988 | Kirby et al. | ...................... | 114/244 |
| 4,756,268 A * | 7/1988 | Gjestrum et al. | ...................... | 114/242 |
| 4,890,568 A * | 1/1990 | Dolengowski | ...................... | 114/246 |
| 5,357,892 A * | 10/1994 | Vatne et al. | ...................... | 114/244 |
| 5,402,745 A * | 4/1995 | Wood | ...................... | 114/244 |
| 5,443,027 A * | 8/1995 | Owsley et al. | ...................... | 114/244 |
| 5,532,975 A * | 7/1996 | Elholm | ...................... | 367/16 |

(Continued)

FOREIGN PATENT DOCUMENTS

EP 2466562 A 6/2010 .............. G01V 1/38
WO 0020895 4/2000

OTHER PUBLICATIONS

PCT Search Report, dated Nov. 4, 2010, Application No. PCT/US2010/029296.

*Primary Examiner* — Ari M Diacou

(57) ABSTRACT

A technique for seismic surveying is presented in which a towed array, marine seismic spread, includes a plurality of streamers and a deflector system. The deflector system laterally spreads the seismic streamers, wherein at least one streamer in the spread is deflected using more than one deflector attached to the tow cable or streamer, and where the deflectors are not connected to a float on the sea surface. Other aspects of the technique include methods for towing such a spread and for controlling such a spread. Still other aspects include computing resources which may be used to perform the methods.

27 Claims, 4 Drawing Sheets

(56) References Cited

U.S. PATENT DOCUMENTS

| | | | |
|---|---|---|---|
| 6,011,752 A * | 1/2000 | Ambs et al. | 367/17 |
| 6,142,091 A * | 11/2000 | Henriksen | 114/245 |
| 6,498,768 B1 * | 12/2002 | Gjestrum et al. | 367/20 |
| 6,671,223 B2 | 12/2003 | Bittleston | |
| 6,691,038 B2 * | 2/2004 | Zajac | 702/14 |
| 6,698,373 B2 * | 3/2004 | Geriene et al. | 114/244 |
| 6,877,453 B2 * | 4/2005 | Hocquet et al. | 114/244 |
| 6,879,542 B2 * | 4/2005 | Soreau et al. | 367/17 |
| 7,080,607 B2 | 7/2006 | Hillesund et al. | |
| 7,162,967 B2 | 1/2007 | Hillesund et al. | |
| 7,270,214 B1 | 9/2007 | Tonnessen et al. | |
| 7,752,988 B2 * | 7/2010 | Axford | 114/245 |
| 7,957,220 B2 * | 6/2011 | Howlid et al. | 367/16 |
| 8,100,078 B2 * | 1/2012 | Storteig et al. | 114/246 |
| 2003/0039170 A1 * | 2/2003 | Soreau et al. | 367/17 |
| 2004/0065244 A1 * | 4/2004 | Hocquet et al. | 114/244 |
| 2005/0270902 A1 | 12/2005 | Tonnessen | |
| 2006/0215489 A1 | 9/2006 | Solheim et al. | |
| 2006/0227657 A1 * | 10/2006 | Tveide et al. | 367/16 |
| 2007/0019504 A1 | 1/2007 | Howlid et al. | |
| 2008/0022913 A1 * | 1/2008 | Toennessen et al. | 114/245 |
| 2008/0192570 A1 * | 8/2008 | Tenghamn et al. | 367/17 |
| 2008/0205192 A1 * | 8/2008 | Keskes et al. | 367/17 |
| 2009/0316526 A1 * | 12/2009 | Grall | 367/20 |
| 2010/0149910 A1 | 6/2010 | Martin | |
| 2013/0010570 A1 * | 1/2013 | Sudow et al. | 367/16 |

* cited by examiner

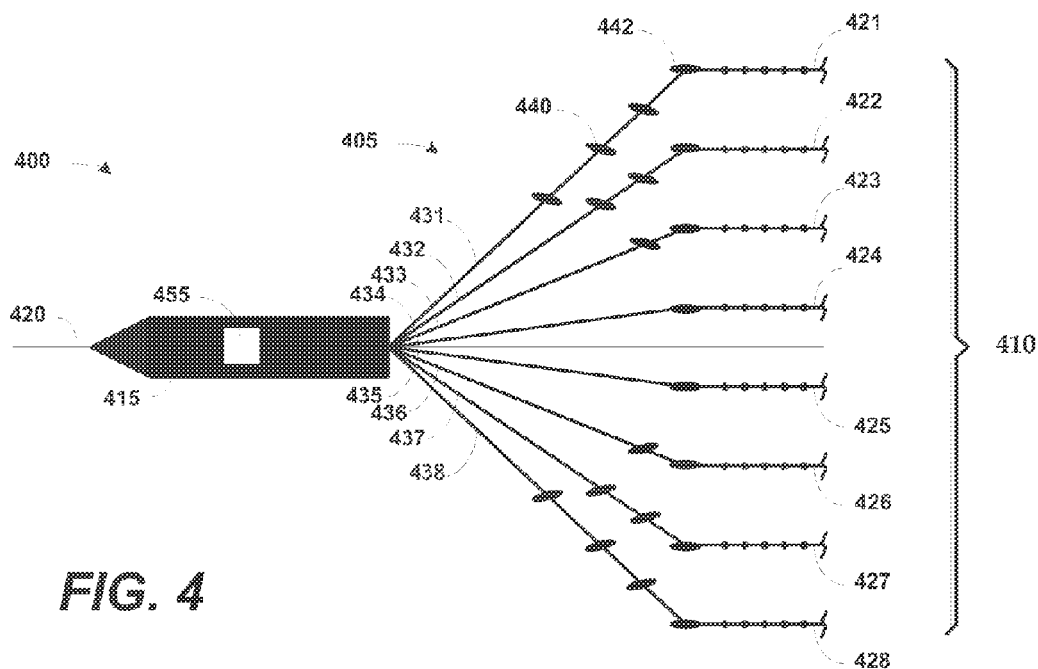
FIG. 4
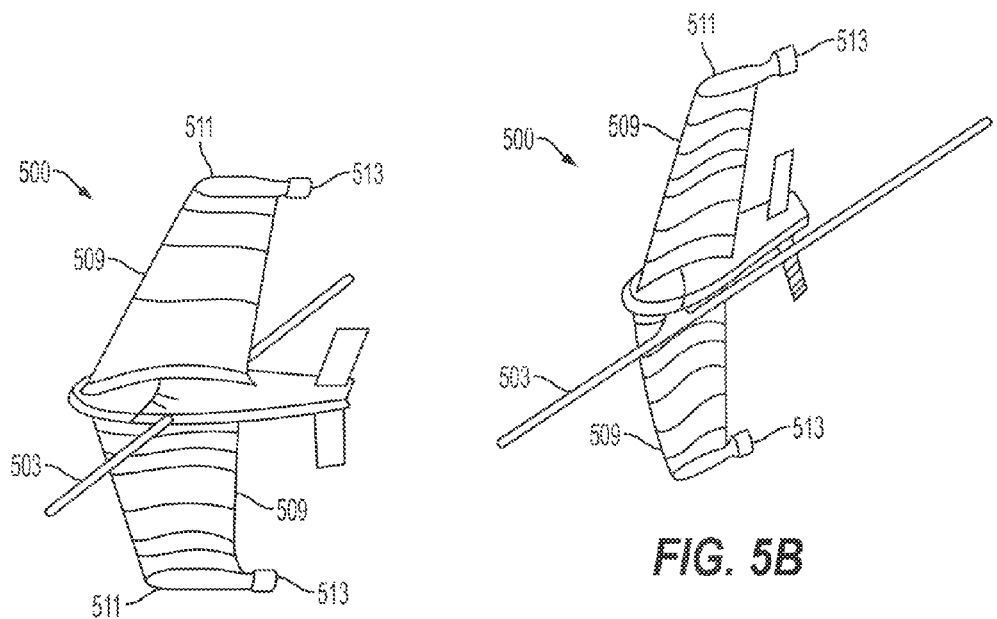
FIG. 5A
FIG. 5B

MULTIWING SURFACE FREE TOWING SYSTEM

CROSS-REFERENCE TO RELATED APPLICATIONS

The priority of U.S. Provisional Application Ser. No. 61/166,589, entitled "Multiwing Surface Free Towing System", filed Apr. 3, 2009, in the name of the inventor Rune Tonnessen is hereby claimed under 35 U.S.C. §119(e). This application is also hereby incorporated for all purposes as if set forth herein verbatim.

The earlier effective filing date of U.S. Provisional Application Ser. No. 61/166,589, entitled "Multiwing Surface Free Towing System", filed Apr. 3, 2009, in the name of the inventor Rune Tonnessen is hereby claimed under 35 U.S.C. §120.

STATEMENT REGARDING FEDERALLY SPONSORED RESEARCH OR DEVELOPMENT

Not applicable.

BACKGROUND OF THE INVENTION

1. Field of the Invention

The present invention pertains to towed array marine seismic surveying.

2. Description of Related Art

The exercise of examining subterranean geological formations for deposits of hydrocarbon deposits is known as "seismic surveying". Sometimes the geological formations lie beneath a body of water. This type of seismic survey is known as a "marine" seismic survey. Marine seismic surveys may be performed in salt, fresh, or brackish waters and are not limited to saltwater environments.

One type of marine seismic survey is called a "towed-array" seismic survey. In such a survey, a tow vessel tows an array of equipment along a sail line. The array usually includes a number of seismic streamers, typically up to eight of them, each up to several kilometers long. The streamers are populated with a number of instruments, most notably seismic receivers such as hydrophones and sometimes particle motion sensors. Sometimes the array will also include a plurality of seismic sources. As the array is towed, the streamers ideally straighten and roughly parallel each other. Sometimes environmental or survey conditions adversely impact the shape of the array, but this is the ideal shape.

Towed-array seismic survey spreads therefore include control systems to control the position of various elements in the spread. Some of these elements are used for data acquisition. But others are used for the express purpose of positioning some portion of the spread, thereby controlling the shape of the spread and, hence, the position of the acquisition elements.

SUMMARY OF THE INVENTION

A technique for seismic surveying is presented in which a towed array, marine seismic spread, comprises a plurality of streamers and a deflector system. The deflector system laterally spreads the seismic streamers, wherein at least one streamer in the spread is deflected using more than one deflector attached to the tow cable or streamer, and where the deflectors are not connected to a float on the sea surface. Other aspects of the technique include methods for towing such a spread and for controlling such a spread.

BRIEF DESCRIPTION OF THE DRAWINGS

The invention may be understood by reference to the following description taken in conjunction with the accompanying drawings, in which like reference numerals identify like elements, and in which:

FIG. 4 depicts, in a stylized fashion, one particular implementation of the embodiment in FIG. 1;

FIG. 5A-FIG. 5C are two perspective views and a schematic vertical cross-sectional view through the streamer positioning device as first shown in FIG. 4;

Figure 1:
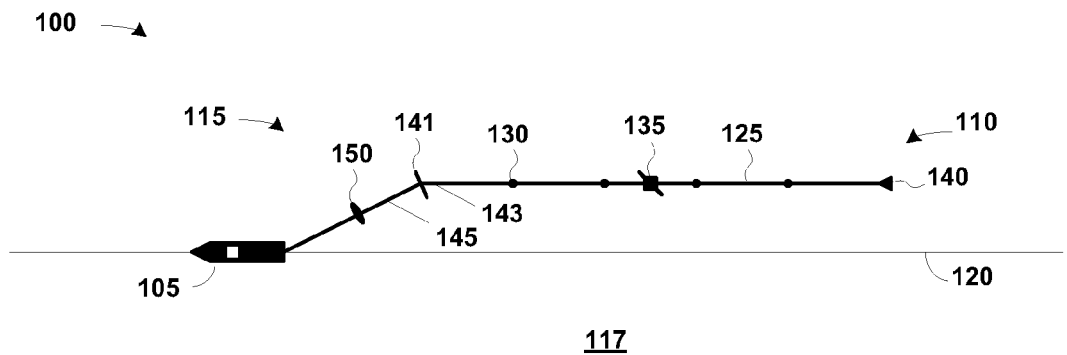
FIG. 1-FIG. 2 depict one particular, exemplary embodiment of a towed-array survey spread assembled, deployed, and operated in accordance with one aspect of the present invention in an overhead, bird's eye, view and in a plan profile view, respectively.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE SELECTED EMBODIMENTS OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims.

Furthermore, the phrase "capable of" as used herein is a recognition of the fact that some functions described for the various parts of the disclosed apparatus are performed only when the apparatus is powered and/or in operation. Those in the art having the benefit of this disclosure will appreciate that the embodiments illustrated herein include a number of electronic or electro-mechanical parts that, to operate, require electrical power. Even when provided with power, some functions described herein only occur when in operation. Thus, at times, some embodiments of the apparatus of the invention are "capable of" performing the recited functions even when they are not actually performing them—i.e., when there is no power or when they are powered but not in operation.

A system comprising a deflector system, for laterally spreading out seismic streamers, where at least one streamer in the spread is deflected using more than one deflector attached to the tow cable or streamer, and where the deflectors are NOT connected to a float on the sea surface. The aft deflector in the series of deflectors on the tow cable may have neutral lift in a nominal position and may be used to steer the front end of the streamer to follow a pre-defined track.

Deflectors as mentioned above following either of the two principles:

A) A big Q-FIN® like deflector with two independently rotatable wing elements, or one wing element that can adjust its angle of attack and two flaps to control tilt. This wing system requires a system for measuring the depth, and contrary to the Q-FIN®, this system also requires a system for measuring the angle of attack of the deflector relative to the ambient water flow, as disclosed in, for example, U.S. Patent Publication No. 2005-0270902, incorporated by reference below. A wing system like this need to be actively controlled by monitoring the depth and angle of attack and make active control actions with, e.g., a closed loop PID controller, or other well known control methods.

B) A deflector that is self-stabilizing in depth and around its pre-set angle of attack. This system may comprise two independently rotatable wing elements, or one wing element that can adjust its angle of attack and two flaps to control tilt. In addition it requires a tail flap to control angle of attack, the tail flap and the flaps to control tilt, may be the same if the wings are swept. A system like this need to monitor the depth but do not need to monitor the angle of attack. It is less energy demanding than alternative A). The control of such a wing will be on a "change set point" basis rather than continuous control.

The communication with the deflectors takes place either through cable takeouts from the lead-in/streamer, via coil (as with DIGI-BIRDS®) or via acoustic signals. It is likely that system A will require cable takeout because of the required bandwidth, whereas system B will do with acoustic system or coil communication. System A will probably require more power than can be stored in a battery so then the power need to come from the lead-in or via a generator system as disclosed in, for example, U.S. patent application Ser. No. 10/869,465, now issued as U.S. Pat. No. 7,270,214, incorporated by reference below. The same applies for system B.

A positioning system (position determination), comprising one of the two or a combination of the two alternatives to follow:

i) An underwater acoustic system linked to a GPS system on the sea surface. Each streamer is having a tail float with a GPS. The GPS floats ahead of the tail of the spread sits on floats that, for each side of the spread (mirrored about the centerline of the spread) the GPS floats are all connected to the same streamer.

ii) An underwater acoustic system linked to a GPS system on the sea surface. Each streamer is having a tail float with a GPS. The GPS floats ahead of the tail of the spread sits on floats that are diverted by separate tow cables and using separate deflectors, not connected to the streamer system.

The new towing system may be combined with traditional towing systems using MONOWINGs®, door deflectors, systems using separations ropes between streamers, systems using Muscle (multiple lead-in takeouts), and over under streamer systems. Importantly the new towing system may be unlinked to the surface (apart from the tail, and we may even envisage that the tail may be submerged as well) which makes it well suitable for vector sensing streamer to be towed at larger depths than traditional streamer systems.

The present invention will now be described with reference to the attached figures. Various structures, systems and devices are schematically depicted in the drawings for purposes of explanation only and so as not to obscure the present invention with details that are well known to those skilled in the art. Nevertheless, the attached drawings are included to describe and explain illustrative examples of the present invention.

FIG. 1 depicts in a bird's eye, or overhead, view one particular, exemplary embodiment of a towed-array survey spread 100 assembled, deployed, and operated in accordance with one aspect of the present invention. The spread 100 includes a survey vessel 105 towing a streamer 110 from a lead-in 115 through a body of water 117. The survey vessel 105, in operation and during acquisition, tows the streamer 110 from the lead-in 115 along the predetermined path 120, sometimes referred to as a "sail line".

The depiction of the streamer 110 is highly stylized, as will be appreciated by those in the art having the benefit of this disclosure. In the illustrated embodiment, the streamer 110 comprises a streamer cable 125 on which a plurality of acquisition elements 130 (only one indicated) and a plurality of positioning elements 135. Those in the art will appreciate that the streamer 110 will typically be of substantial length, perhaps several kilometers long, with a significantly higher number of both acquisition elements 130 and positioning elements 135. The streamer 110 may be designed and assembled in accordance with convention practice in light of implementation specific details such as survey requirements. Thus, details such the length of the streamer 110, the construction of the streamer cable 125, the number and distribution of acquisition elements 130, and the number and distribution of the positioning elements 135 will vary depending on the particular implementation.

The acquisition elements 130 typically include at least pressure sensors such as hydrophones and, in some embodiments, particle motion sensors. The hydrophones and particle motions sensors are typically housed in "sondes" or in pockets of the streamer cable 125, none of which are separately shown for the sake of clarity and so as not to obscure the present invention. In the illustrated embodiment, the acquisition elements 130 include both pressure sensors and particle motion sensors, and so the streamer 110 acquires what is known as "multi-component" data in acquisition. Note, however, that the invention is not limited to multi-component streamers.

The streamer 110 also includes conventional positioning elements 135. The positioning elements 135 control the respective point on the streamer 110 at which they are assembled. The positioning elements may include, for example, birds or deflectors. In this particular embodiment, the streamer 110 includes a conventional deflector 141, or "spreader", at the head 143 of the streamer 110 in accordance with conventional practice. The tail buoy 140 is in a sense a positioning device because the drag created by towing the streamer 110 through the water operates more strongly on it, tending to straighten out the streamer 110 and help prevent tangling.

Those in the art having the benefit of this disclosure will appreciate that the depiction of the spread 100 in FIG. 1 is stylized in other ways. For example, the spread 100 will typically comprise several streamers 110, perhaps as many as eight or twelve, although some new vessels can tow more than 20. The seismic spread 100 will also include at least one seismic source (not shown) that has been omitted for the sake of clarity and so as not to obscure the present invention. Note that the seismic source is not necessarily towed by the same survey vessel 105 as the streamer 110.

The lead-in 115 comprises a tow line 145 and a submerged positioning device 150. The positioning element 150 is submerged, or "surface free", in that it is not deployed at the surface or linked to the surface of the water by, for example, suspension from a float or some other mechanism. Thus, the submerged positioning element 150 has no direct physical connection to a body on the water surface. This aspect is shown more clearly in FIG. 2. The depiction in this drawing is a plan profile view of the survey spread 100 of FIG. 1. It is also stylized, as is apparent from the depth of streamer 110 being greater than the draft of the survey vessel 105. Streamers are typically towed at a depth of approximately 5 m-6 m, which is usually well within the draft of the survey vessel. But note that there is no link between the positioning element 150 and the surface 200 of the water 117. The submerged positioning elements 150 may be active or passive as described more fully below.

Figure 3:
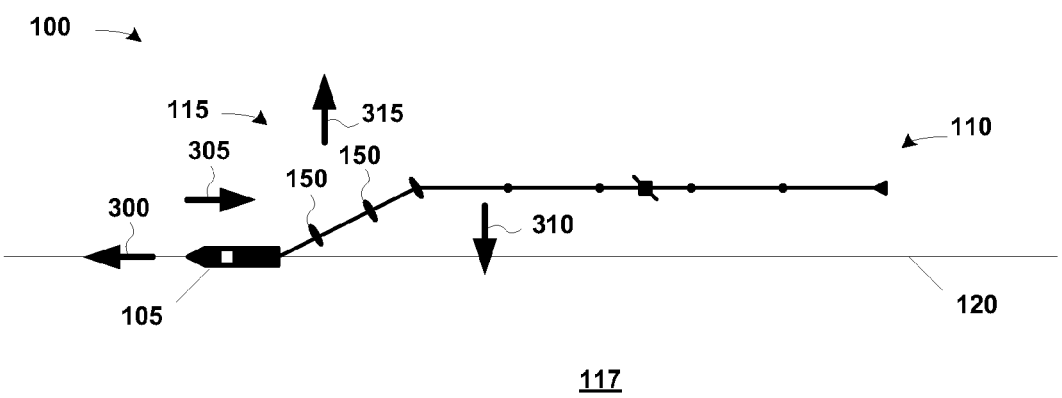
FIG. 3 illustrates the principle of operation for survey spread of FIG. 1.

The principle of operation for the survey spread 100 is illustrated in FIG. 3. As mentioned above, the survey vessel 105 tows the streamer 110 by the lead-in 115 through the water 117 along the predetermined path 120. The survey vessel 105 tows the streamer 110 in the direction indicated by the arrow 300. This creates a drag, represented by the arrow 305, on the lead-in 115 that tends to push the streamer 110 inward in the crossline direction, represented by the arrow 310. The submerged positioning device 150 generates a lift, represented by the arrow 315, that counteracts the crossline push 310 of the drag 305. The submerged positioning devices 150 therefore help control position of the streamer 115.

The principle of operation illustrated in FIG. 3 is described relative to drag. Those in the art, however, will realize that are other hydrodynamical forces besides drag involved that should be offset. Those in the art will further realize that these forces act not only on the lead-in 115, but also the streamer 110. Thus, the submerged positioning device 150, having no direct physical connection to a body on the water surface and being attached to the lead-in 115 or the head of the streamer 110, provides force in the outboard crossline direction offsetting hydrodynamical forces on the lead-in 115 and the streamer 110 so as to maintain the streamer's position relative to the predetermined path, or sail line, 120.

Figure 2:
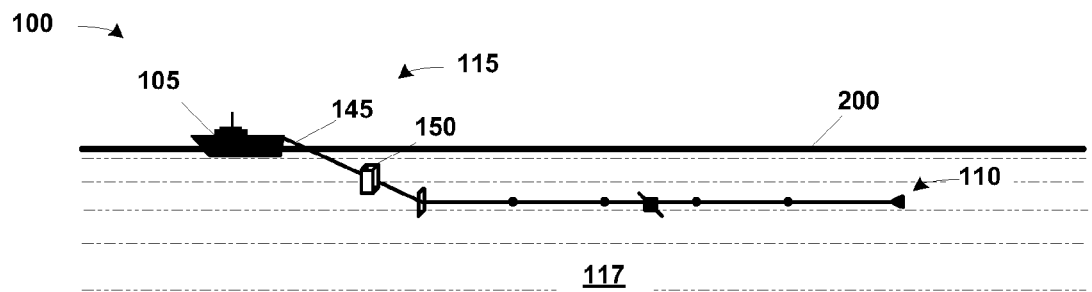

The embodiment illustrated in FIG. 1-FIG. 3 is, however, atypical. As discussed above, a towed array marine seismic survey will typically include eight to ten streamers. This implies to those in the art longer lead-ins at higher angles relative to the sail line that will experience greater drag relative to shorter lead-ins at lower angles. Thus, in a more typical embodiment, there may be differing numbers submerged positioning devices on longer lead-ins at wide spread than on shorter lead-ins at narrower spreads.

FIG. 4 depicts one such more typical embodiment. The survey spread 400 shown in FIG. 4 includes a towing system 405 for a streamer array 410 by which the vessel 415 tows the streamer array 410. The streamer array 410 comprises eight streamers 421-428. The depiction of the streamers 421-428 is truncated as the truncated portion is not material to the practice of the invention. The towing system 405 itself comprises a eight lead-ins 431-438, a respective one for each of the eight streamers 421-428, and a plurality of submerged positioning devices 440, 442, only of one each being indicated.

The submerged positioning devices 440 are distributed along the lead-ins 431-433 and 436-438 in the manner described above. Note that the further outboard the streamers 421-428 are in the array 410 the more submerged positioning devices 440 that are distributed on the respective lead-ins 431-438. Note that, if one wants to deflect some distance, even small a distance, a positioning device will be needed.

The submerged positioning devices 442 are disposed at the head of their respective streamers 421-428. Note that, in this particular embodiment, the submerged positioning devices 442 replace the conventional deflectors 141 in the embodiment of FIG. 1-FIG. 3, but can be omitted if conventional deflectors 141 are strong enough to create the desired lateral deflection. The submerged positioning devices 442 are in a "neutral" position relative to offsetting the drag on the lead-ins 431-438. They therefore may be used in steering the streamer in addition to offsetting the drag.

As mentioned above, the invention admits variation in the implementation of the submerged positioning devices 440, 442. In general, each of the submerged positioning devices 440, 442 will comprise either two wing elements of 2×1 meter, or one element of 4×1 meter. In this case four deflectors will equal one MONOWING® MK2 in lift. The wing elements may be made of high strength lightweight composite material, allowing manual mounting and dismounting to/from the body. They may also be oriented horizontal to act as a depressor.

The implementations can be roughly categorized as "active" or "passive" in the sense that they can be actively controlled or not. One active device mentioned above is the Q-FIN® bird, produced by WesternGeco, the assignee hereof. The Q-FIN® is what is now called in the art a "steerable bird", whose design and principles of operation are disclosed and claimed in a number of references. These references include PCT International Application WO 00/20895, U.S. Pat. Nos. 7,080,607, and 6,671,223, all of which are incorporated by reference below.

Exemplary passive devices include the MONOWING®, also produced by WesternGeco, and a self-aligned wing system. Note that, although the MONOWING® is passive, some adjustments can be made. These adjustments are made remotely, but manually and quite rarely. A self-aligned wing system will be self-aligned relative to the flow so that its angle of attack is maintained, but it may need an internal controller, either active in the sense of a processor and control software for control, actuators to control depth (by wing splay or flap splay), or alternatively pure mechanical depth control system can be envisaged mechanically sensing the depth and making mechanical actions to adjust wing splay or flap splay.

FIG. 5A shows one particular embodiment of a type of deflector 500 capable of controlling the position of lead-ins 503 in both the vertical and horizontal directions. Note that to deflector 500 differs from a bird in that birds are understood in the art as having much smaller wings used to control depth and, lately, also lateral steering of the streamer. Also, birds are typically much smaller than this device disclosed herein. The device is instead more akin to a deflector as deflectors are normally understood as wing shaped bodies like doors and Monowings used to deflect the streamer laterally out to its nominal position relative to the centerline of the spread. The deflector 500 is shown clamped onto the lead-in 503 in somewhat similar way as a DIGICOURSE® bird is attached to the streamer as shown in FIG. 5A-FIG. 5B. FIG. 5A depicts a high lift situation, and FIG. 5B depicts a low lift situation when almost parallel to the lead-in 503.

The deflector 500 may be equipped with a local control system (not shown in FIG. 5A-FIG. 5B) that controls the movement of the wing elements 509, or main wing flaps (not shown) by calculating a desired change in the angle of the wings 509, or flaps, and then selectively driving the wing or flap motors (not shown) to effectuate this change. This mechanism is applied to the tail wings that control the angle of attack of the main wings as well as it applies to splaying of main wing elements or main wing flaps for the purpose of tilting the deflector for the deflector to seek another depth. This control is exercised within the context of instructions from an array controller 455, shown in FIG. 4, received over a communications line, an acoustic communications system, or through coils. Such instructions may include, for example, desired horizontal and vertical positioning.

Figure 5C:
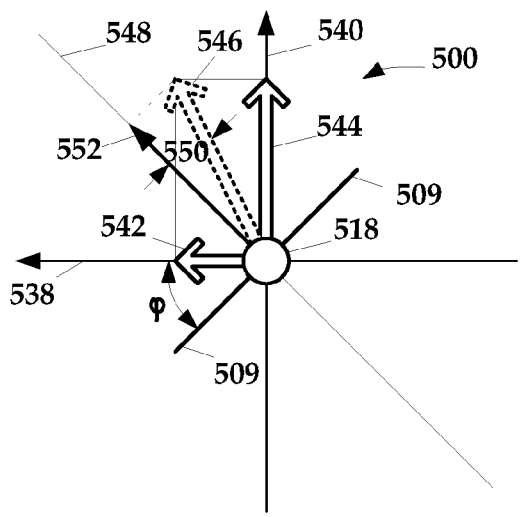

FIG. 5C shows a schematic vertical cross-sectional view through the steerable deflector 500 permitting description of the operation in more detail. Also shown in FIG. 5C are a horizontal coordinate axis 538 and a vertical coordinate axis 540. During operation of the streamer positioning control system, the array controller 455, shown in FIG. 4, transmits at regular intervals (such as every five seconds) a desired horizontal force 542 and a desired vertical force 544 to the local control system.

The desired horizontal force 542 and the desired vertical force 544 are combined within the local control system to calculate the magnitude and direction of the desired total force 546 that the array controller 455 has instructed the local control system to apply to the lead-in 503. The array controller 455 could alternatively provide the magnitude and direction of the desired total force 546 to the local control system instead of the desired horizontal force 542 and the desired vertical force 544. While the desired horizontal force 542 and the desired vertical force 544 are calculated by the array controller 455, it is also possible for the local control system to calculate one or both of these forces using a localized displacement-force conversion program.

Note that control may also be exerted in other ways. Alternatively, one can make force acting in the direction of the desired displacement change, then measure the resulting change in displacement, then make new force change commands as decided by the control loop, PID controller or other control loops (not shown). It is not necessary to calculate the force, just to make a force change and determine the resulting response.

Returning to FIG. 5C, the array controller 455 can transmit location information to the local control system instead of force information. Instead of the desired vertical force 544, the array controller 455 can transmit a desired vertical depth and the local control system can calculate the magnitude and direction of the deviation between the desired depth and the actual depth. Similarly, instead of transmitting a desired horizontal force 542, the array controller 455 can transmit the magnitude and direction of the displacement between the actual horizontal position and the desired horizontal position of the deflector 500.

When the local control system has a new desired horizontal force 542 and desired vertical force 544 to be applied, the wings 509 will typically not be in the proper orientation to provide the direction of the desired total force 546 required. As can be seen in FIG. 5C, the wings 509 introduce a force into the lead-in 503 along an axis perpendicular to the rotational axis of the wings 509 and perpendicular to the streamer. This force axis 548 is typically not properly aligned with the desired total force 546 when new desired horizontal and vertical force values are received from the array controller 455 or determined by the local control system and some rotation of the deflector 500 is required before the deflector 500 can produce this desired total force 546. As can be seen, the force axis 548 is directly related to the bird roll angle, designated in FIG. 5C as $\phi$.

The local control system optimizes the control process by projecting the desired total force 546 onto the force axis 548 (i.e., multiplying the magnitude of the desired total force by the cosine of the deviation angle 550) to produce an intermediate desired force 552 and then adjusting the wing common angle $\alpha$ (the angle of the wings with respect to the bird body 518, or the average angle if there is a non-zero splay angle) to produce this magnitude of force along the force axis. The calculated desired common wing angle is compared to the current common wing angle to calculate a desired change in the common wing angle and the wing motors are actuated to produce this desired change in the orientation of the wings.

A splay angle is then introduced into the wings 509 to produce a rotational movement in the bird body 518 (i.e., to rotate the force axis 548 to be aligned with the desired total force 546). The splay angle is the difference between the angles of the wings 509 with respect to the bird body 518, or if applying flaps rather than splaying the main wings, the flaps may be splayed. As the bird body 518 rotates and the force axis 548 becomes more closely aligned with the desired total force 546, the bird roll angle and the bird roll angular velocity are monitored, the splay angle is incrementally reduced, and the common angle is incrementally increased until the intermediate desired force 552 is in the same direction and of the same magnitude as the desired total force. The local control system carefully regulates the splay angle to ensure that the streamer is stable in roll degree of freedom. The calculated common wing angle and the splay angle are also regulated by the local control system to prevent the wings 509 from stalling and to ensure that the splay angle is prioritized.

Operating power is provided to the deflector 500 over the lead-in 503 in this particular embodiment. As mentioned above, alternative techniques may be employed, such as that disclosed in U.S. Pat. No. 7,270,214. In general, this technique deploys a vortex concentrator 511 at the tip of a hydrofoil or wing and a propeller 513 proximate the vortex concentrator such that the propeller 513 acts to reduce a rotational velocity of vortices proximate the tip of the hydrofoil. The propeller 513 is coupled to a generator (not shown) to convert the extracted rotational energy into electrical power. The power generated can be used to power the local control system and wing motors, for example. A battery (also not shown) may also be included to store any excess power generated.

The Q-WING® embodiment will consume a considerable amount of power through the lead-in or self generating el-power from tip vortex power extraction as described above. It will also require a compass in the body to be able to adjust the wings to the required angle of attack relative to the flow. It may also use a flow meter localized on the deflector in some embodiments.

The self-aligned wing system may therefore be more desirable in some embodiments. A wing system that is self stabelizing around a given angle of attack to the flow and around a given depth requires little power, does not need a compass in the body, and does not need to measure the local flow. Another version may be considered where the wing is self aligned relative to angle of attack, but applies a control loop control system to actively control depth by controlling wing/or flap splay.

Returning now to FIG. 4, in operation, the submerged positioning devices 440, 442 provide a "lift", or a force in the outboard crossline direction, that offsets the drag on the lead-ins 431-438 as well as other hydrodynamical forces seeking to bring the streamer to a position straight behind the vessel as described above relative to FIG. 3. Those in the art will appreciate that lifting forces of hydro/aerofoils are always in the direction normal to the fluid inflow and normal to the lifting surface (hydrofoil), whether those forces be vertical or horizontal. The neutrally positioned, submerged positioning devices 442, depending on the amount of lateral deflection of their respective streamer, have a lot of reserve lift capacity remaining when the streamer is deflected to its nominal position. This remaining capacity can be used for active steering of the front end of the respective streamer if that is desired.

The number of submerged positioning devices 440, 442 is determined by the required deflection force for any given implementation. On the inner streamers 424, 425, one will frequently be sufficient. On the second innermost streamers 423, 426, one is often enough as well although two are shown in this particular embodiment. Typically, the third innermost streamers 422, 427 will need at least two. The required deflection force is determined by the streamer separation and the layback, or distance from the vessel to the front end of the streamer as well as the chosen size and lift characteristics of the positioning device 440, 442.

The submerged positioning devices 440, 442 are actively controlled as described above relative to FIG. 5A-FIG. 5C to provide this lift in the embodiment of FIG. 4. This control is provided by the array controller 455, shown in FIG. 4, and the local control system. Both the array controller 455 and the local control system are computer implemented.

Figure 6:
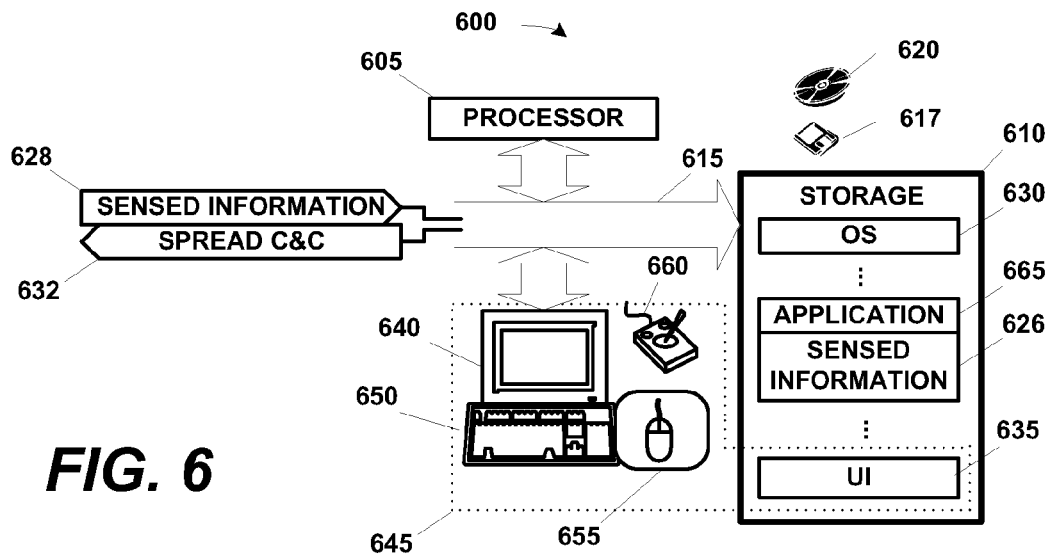
FIG. 6-FIG. 7 depict in block diagrams selected portions of the hardware and software architectures of computing apparatuses such as may be employed in some aspects of the present invention.
Figure 7:
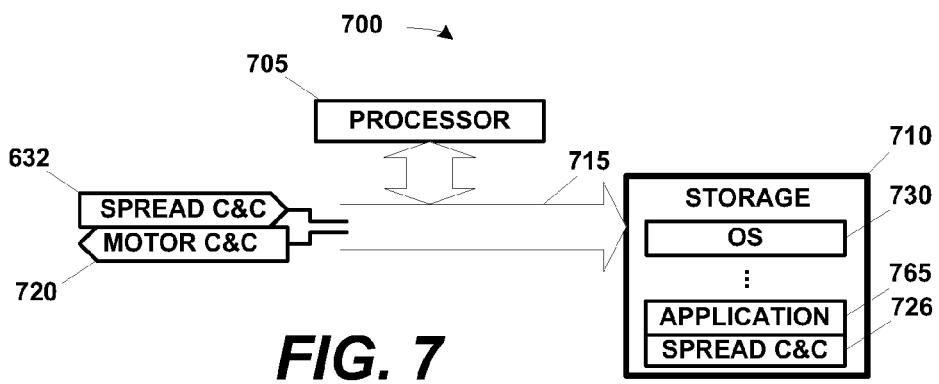

For example, the array controller 455 can be implemented by a computing apparatus such as the computing apparatus 600 shown in FIG. 6. FIG. 6 only shows selected aspects of the hardware and software architecture for the computing apparatus 600. The computing apparatus 600 includes a processor 605 communicating with storage 610 over a bus system 615. The storage 610 may include a hard disk and/or random access memory ("RAM") and/or removable storage such as a floppy magnetic disk 617 and an optical disk 620.

The storage 610 is encoded with a number of software components associated with various functions acquired seismic data 625. The software components include, for example, a data structure 626 containing sensed information 628, an operating system 630, user interface software 635, and an application 665. The user interface software 635, in conjunction with a display 640, implements a user interface 645. The user interface 645 may include peripheral I/O devices such as a keypad or keyboard 650, a mouse 655, or a joystick 660.

The processor 605 runs under the control of the operating system 630, which may be practically any operating system known to the art. The application 665, when invoked, performs the method of the present invention in which it controls the position of the array 405 through the spread control and command ("C&C") signals 632. This control is exerted, in part, through active control of the submerged positioning devices 440, 442 described herein. The application 665 may take some other form, such as a daemon or a script, as the nature of the software component performing this functionality is not material to the practice of the invention. The sensed information is typically positioning data, whose acquisition and use are described below.

Similarly, the local control system mentioned above may be implemented by a computing apparatus such as the computing apparatus 700. The computing apparatus 700 is somewhat simpler, comprising only a processor 705, storage 710, and bus system 715. The processor 705 runs under the control of the OS 710 and executes the application 765 to act on the spread command and control signals 632 (buffered in the data structure 726) to generate the motor command and control signals 720.

Note, however, that the invention admits wide latitude in the implementation of the computing aspects of the present invention. For example, the functionality of the array controller 455 and the local control system can be hosted on a single computing apparatus such that a single, universal controller performs all control functions. Or the control functionality described herein may be just a part of a computing apparatus handling additional tasks associated with the survey. For another example, the survey spread 400 will includes a navigation controller (not shown) that may be implemented on the same computing apparatus as the array controller 455.

As is apparent from the discussion above, some portions of the detailed descriptions described or incorporated herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed. Usually, though not necessarily, the physical quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 8A:
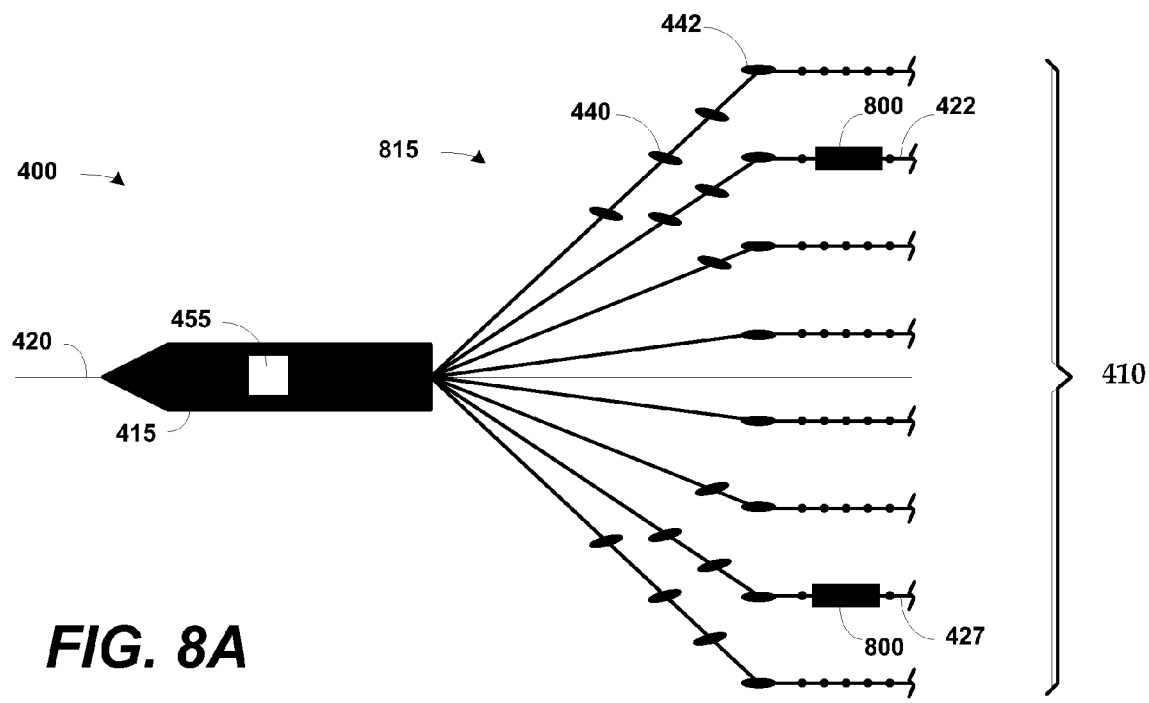
FIG. 8A-FIG. 8B illustrate embodiments alternative to that of FIG. 4 in which floats are used to obtain positioning information.
Figure 8B:
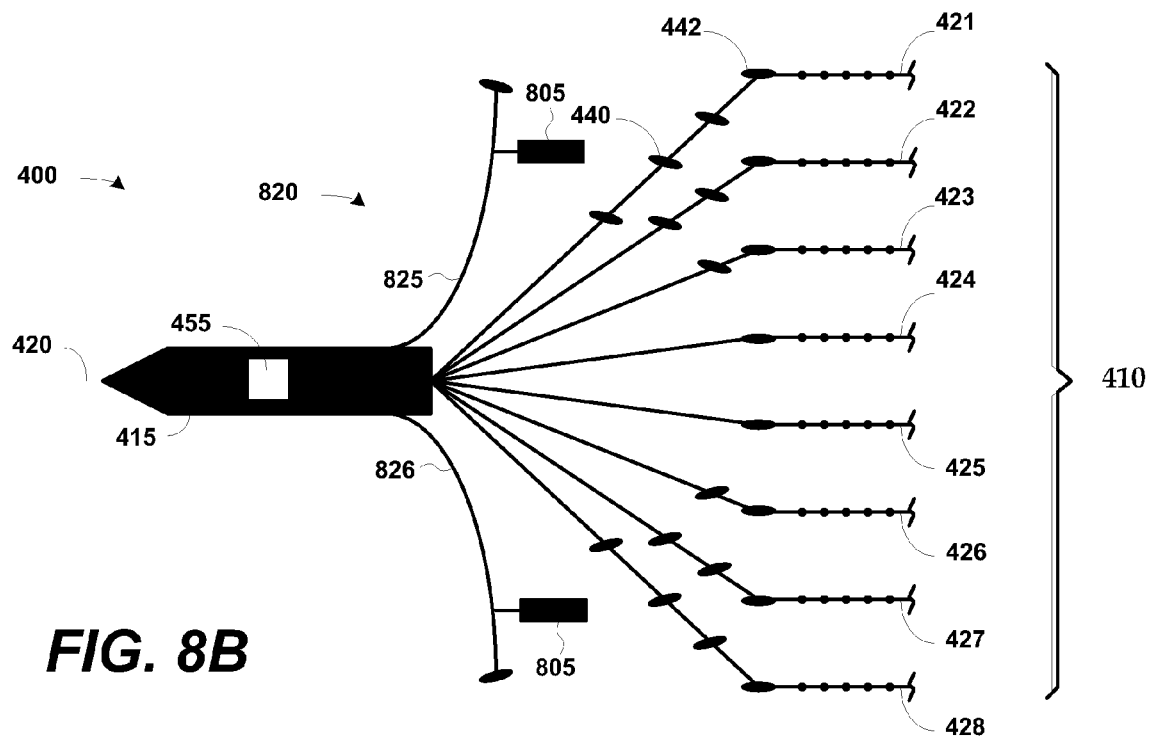

The ability to determine or infer the position of the array 405, such as the streamers 421-428 and the lead-ins 431-438, may be highly desirable in some embodiments. FIG. 8A-FIG. 8B each discloses an alternative embodiment in which the array 405 of FIG. 4 has been modified for position determination. In FIG. 8A, the streamers 422, 427 each include one or more floats 800 while in FIG. 8B, the array 405 is equipped with independently towed floats 800. In FIG. 8B, the floats 800 in the array 820 are "separately towed" in that they are towed separately from the streamer array 410. The floats 800 are towed by separate ropes or umbilicals 825, 826. Because the floats 800 are "separately towed", they will not interfere with the deployment or retrieval of the streamers 421-428.

Referring now to both FIG. 8A-FIG. 8B, all floats 800 are equipped with a GPS receiver (the antenna needs to be at the surface) and has a known relation (distance and direction) to an acoustic source and/or an acoustic receiver, in which case the intrinsic ranging by modulated acoustics ("IRMA") system used to range between IRMA nodes on the streamers also can range to or from this point having a known relation to the GPS float, end hence is able to tie the global coordinate system to the underwater IRMA network.

Multiple floats 800 and GPS receivers can be used for redundancy and for improvement in position determination accuracy. One embodiment may use two to three floats 800 on each side of the spread. But to retain the flexibility of being able to deploy/recover streamers over and under each other, the floats 800 are placed on one streamer per side (port or starboard) of the array 815 only. In this way all starboard streamers can move either over or under the other streamers on the starboard side and the same on the port side.

The embodiment of FIG. 8A uses GPS receivers for positioning determination, but any satellite-based navigation and/or positioning system may be used. GPS is, more particularly, one type of global navigation satellite systems ("GNSS"), whether they be GNSS-1 or GNSS-2. Other GNSS systems are currently in development and include GLONASS (Russian Federation), Galileo (European Union), and Compass (People's Republic of China). The presently disclosed technique may be employed in conjunction with any of these GNSS systems as well as others now in use or to be developed hereafter. The presently disclosed technique may also be employed with regional navigation systems such as Beidou, Doppler Orbitography and Radio-positioning Integrated by Satellite ("DORIS"), Indian Regional Navigational Satellite System ("IRNSS"), Quasi-Zenith Satellite System ("QZSS"). The technique may also be employed with or without augmentation techniques such as Wide Area Augmentation System, the European Geostationary Navigation Overlay Service, the Multi-functional Satellite Augmentation System, Differential GPS, and Inertial Navigation Systems.

In the embodiments disclosed above, the submerged positioning devices 440, 442 are attached to the lead-ins 431-438 at regular intervals The desired nominal separation between the streamers 421-428 can be achieved by adding more submerged positioning devices 440, 442 on the lead-ins 431-438 as needed. This eliminates the need for separation ropes, although it may be combined with traditional towing system where separation ropes are used. It provides a low drag system. The submerged positioning devices 440, 442 may also be used anywhere on the streamers 421-428, even at the tail end. They may also be used for steering source arrays (not shown).

The submerged positioning devices 440, 442 have no connection to the sea surface with the exception of, in some embodiments, the tail. In this sense, they are "surface free" and the streamer array 410 may be considered "surface free". In the embodiment of FIG. 4, the entire streamer array 410 is surface free. The streamers 421-428 may therefore be deployed/and retrieved in the middle of the spread and be able to dive below the other streamers and pop up on the outside/inside. The embodiment of FIG. 8A exhibits these benefits as well, although to a lesser degree given that the floats 800 are not "surface free", that is, they are at the sea surface. Thus, the streamer arrays of the embodiments of FIG. 8A are "essentially surface free" rather than "surface free".

The presently disclosed technique is close to a theoretical optimum when it comes to minimizing system drag and maximizing system lift. There is no limit to how wide one can tow given the lead-in is strong enough and given no restrictions on layback. (This is subject to data sampling requirements.) It provides the ability to position the front end of the streamer at any depth (within some limitations). It facilitates steering the streamer front end.

The technique also permits fully independent and more effective deployment and recovery of all streamers in the array. It permits streamer maintenance even in rough weather. The array has no connection to the sea surface and experiences reduced tugging noise. Being surface free also allow for deflectors steerable source when in a 0- and negative offset situation as the source may be steered across the lead-ins without encountering conflicts with lead-in floats.

The presently disclosed technique also provides certain logistical advantages. By removing the need for space demanding large deflectors and their space demanding handling cranes, a lot of space is freed up on or close top the gun deck, space that can be used for space demanding source configurations such as e.g. over/under sources, etc The steerable smaller devices are suitable for positioning streamers in o/u configuration. It is better suited for the space restricted vessels. The limited size of the deflector allows for deployment directly off the streamer deck. It is also very flexible with respect to streamer platform such as N4, Q, N6, over/under, and in terms of how to configure the towing system including steerable sources. From a manufacturing point of view, a large scale production series will post cost advantages and as well as quality control advantages. From an engineering point of view, it is more attractive to work on smaller, less costly units, allowing for more full scale testing and more iteration on prototypes.

Note that not all embodiments will manifest or exhibit from all of these characteristics or benefits to the same degree. For example, as noted above, the embodiments of FIG. 8A-FIG. 8B are not entirely surface free, and so will be somewhat more limited in this respect that will the embodiment of FIG. 4, which is entirely surface free. Indeed, some embodiments might not manifest or exhibit some of these characteristics or benefits to any degree at all.

The following are hereby incorporated by reference in full as if set forth herein verbatim for all purposes as modified by the teachings set forth herein:

- U.S. Provisional Application Ser. No. 61/166,589, entitled "Multiwing Surface Free Towing System", filed Apr. 3, 2009, in the name of the inventor Rune Tonnessen;
- PCT International Application WO 00/20895, entitled "Control System for Positioning of Marine Seismic Streamers", filed under the Patent Cooperation Treaty on Sep. 28, 1999, in the name of Services Petroliers Schlumberger as assignee of the inventors Oyvind Hillesund et al.
- U.S. patent application Ser. No. 10/863,321, entitled "Method and Apparatus for Measuring an Ambient Water Velocity Near a Deflector Device", and filed Jun. 8, 2004, in the name of the inventor Rune Tonnessen
- U.S. Pat. No. 7,270,214, entitled "Method and Apparatus for Reducing and Extracting Wing Tip Vortex Energy", and issued Sep. 18, 2007, to WesternGeco L.L.C. as assignee of the inventor Rune Tønnessen, et al.;
- U.S. Pat. No. 7,080,607, entitled "Seismic Data Acquisition Equipment Control System", issued Jul. 25, 2006, to WesternGeco L.L.C. as assignee of the inventors Øyvind Hillesund and Simon H. Bittleston; and
- U.S. Pat. No. 6,671,223, entitled "Control Devices for Controlling the Position of a Marine Seismic Streamer", issued Dec. 30, 2003, to WesternGeco L.L.C. as assignee of the inventor Simon H. Bittleston.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A towed-array seismic survey spread, comprising:
a plurality of lead-ins operable to be towed by a vessel, wherein, each one of the plurality of lead-ins tows at least one streamer;
at least one submerged positioning device attached to the each one of the plurality of lead-ins;
at least another submerged positioning device attached to either the each one of the plurality of lead-ins or a head of the at least one streamer; and
wherein the positioning devices provide force in an outboard crossline direction offsetting hydrodynamical forces on the plurality of lead-ins and the at least one streamer to maintain the at least one streamer's position relative to the vessel's sail line, and wherein a number of the submerged positioning devices is equal to or greater than a number of the streamers, and the number of submerged positioning devices on each respective lead-in increases from one lead-in to the next from the lead-in closest to the vessel's sail line to the lead-in farthest from the vessel's sail line.

2. The towed-array seismic survey spread of claim 1, wherein the at least one streamer has a submerged positioning device attached to a head of the streamer, and each of the lead-ins is populated by the at least one submerged positioning device.

3. The towed-array seismic survey spread of claim 1, wherein the at least one submerged positioning device is an active device.

4. The towed-array seismic survey spread of claim 3, wherein the towed-array seismic survey spread includes a control system configured to control the active submerged positioning device.

5. The towed-array seismic survey spread of claim 1, wherein the at least one submerged positioning device is a self-stabilizing device.

6. The towed-array seismic survey spread of claim 5, wherein the self-stabilizing device is self stabilizing in its angular orientation around a given set point for the angle of attack relative to the flow.

7. The towed-array seismic survey spread of claim 5, wherein the self-stabilizing device is self-stabilizing in vertical motion around a given set point for its vertical position in the water column.

8. The towed-array seismic survey spread of claim 1, wherein the at least one submerged positioning device comprises means for generating hydrodynamical forces to maintain the streamer's position relative to the vessel's sail line.

9. The towed-array seismic survey spread of claim 8, wherein the means for generating hydrodynamical forces is an active device.

10. The towed-array seismic survey spread of claim 8, wherein the means for generating hydrodynamical forces is a self-stabilizing device.

11. The towed-array seismic survey spread of claim 1, further comprising a positioning system.

12. A method for use during a towed-array seismic survey comprising:
generating hydrodynamical forces to maintain at least one streamer's position relative to a vessel's sail line, wherein the hydrodynamical forces are generated from at least one submerged positioning device having no direct physical connect to a body on the water surface and is attached to a lead-in of a streamer;
providing an additional submerged positioning device attached to either the lead-in or a head of the streamer and
wherein a number of submerged positioning devices is equal to or greater than a number of the streamers, and the number of submerged positioning devices on each respective lead-in increases from one lead-in to the next from the lead in closest to the vessel's sail line to the lead-in farthest from the vessel's sail line.

13. The method of claim 12, wherein generating hydrodynamical forces includes actively controlling the at least one submerged positioning device.

14. The method of claim 12, wherein each of the submerged positioning devices is self-stabilizing.

15. The method of claim 12, further comprising determining a position of selected points on a survey spread of the towed-array seismic survey.

16. The method of claim 12, further comprising independently deploying each of a plurality of streamers in the towed-array seismic survey.

17. The method of claim 12, further comprising independently retrieving each of a plurality of streamers in the towed-array seismic survey.

18. The towed-array seismic survey spread of claim 2, wherein the submerged positioning devices attached to the heads of the streamers have substantially neutral lift and actively steer the streamers.

19. The method of claim 12, wherein the additional submerged positioning device is attached to a head of the streamer, has substantially neutral lift and actively steers the streamer.

20. A towed-array seismic survey spread, comprising:
a vessel;
a plurality of streamers towed by the vessel;
a plurality of lead-ins, each lead-in being coupled between the vessel and a corresponding streamer; and
a plurality of submerged positioning devices with no direct physical connection to a body on the water surface, at least one submerged positioning device being attached to a head of each of the streamers, and at least one additional submerged positioning device being attached to one or more of the lead-ins, wherein the number of submerged positioning devices on each respective lead-in increases from one lead-in to the next from the lead-in closest to the vessel's sail line to the lead-in farthest from the vessel's sail line.

21. The towed-array seismic survey spread of claim 20, wherein at least one streamer closest to the vessel's sail line has no submerged positioning device attached to its corresponding lead-in.

22. The towed-array seismic survey spread of claim 21, wherein the spread includes an odd number of streamers, and the at least one streamer closest to the vessel's sail line is one streamer.

23. The towed-array seismic survey spread of claim 21, wherein the spread includes an even number of streamers, and the at least one streamer closest to the vessel's sail line is two streamers.

24. The towed-array seismic survey spread of claim 21, wherein the streamers disposed laterally outward of the at least one streamer closest to the vessel's sail line include one or more submerged positioning devices attached to their corresponding lead-ins.

25. The towed-array seismic survey spread of claim 20, wherein the submerged positioning devices attached to the heads of the streamers have substantially neutral lift and actively steer the streamers.

26. The towed-array seismic survey spread of claim 1, wherein the number of the plurality of submerged positioning devices is greater than the number of streamers.

27. The method of claim 12, wherein the number of the plurality of submerged positioning devices is greater than the number of streamers.

\* \* \* \* \*